J. D. NELSON.
FLOW INDICATING MEANS FOR DISTRIBUTION SYSTEMS.
APPLICATION FILED JAN. 9, 1913.
1,170,489.
Patented Feb. 1, 1916.
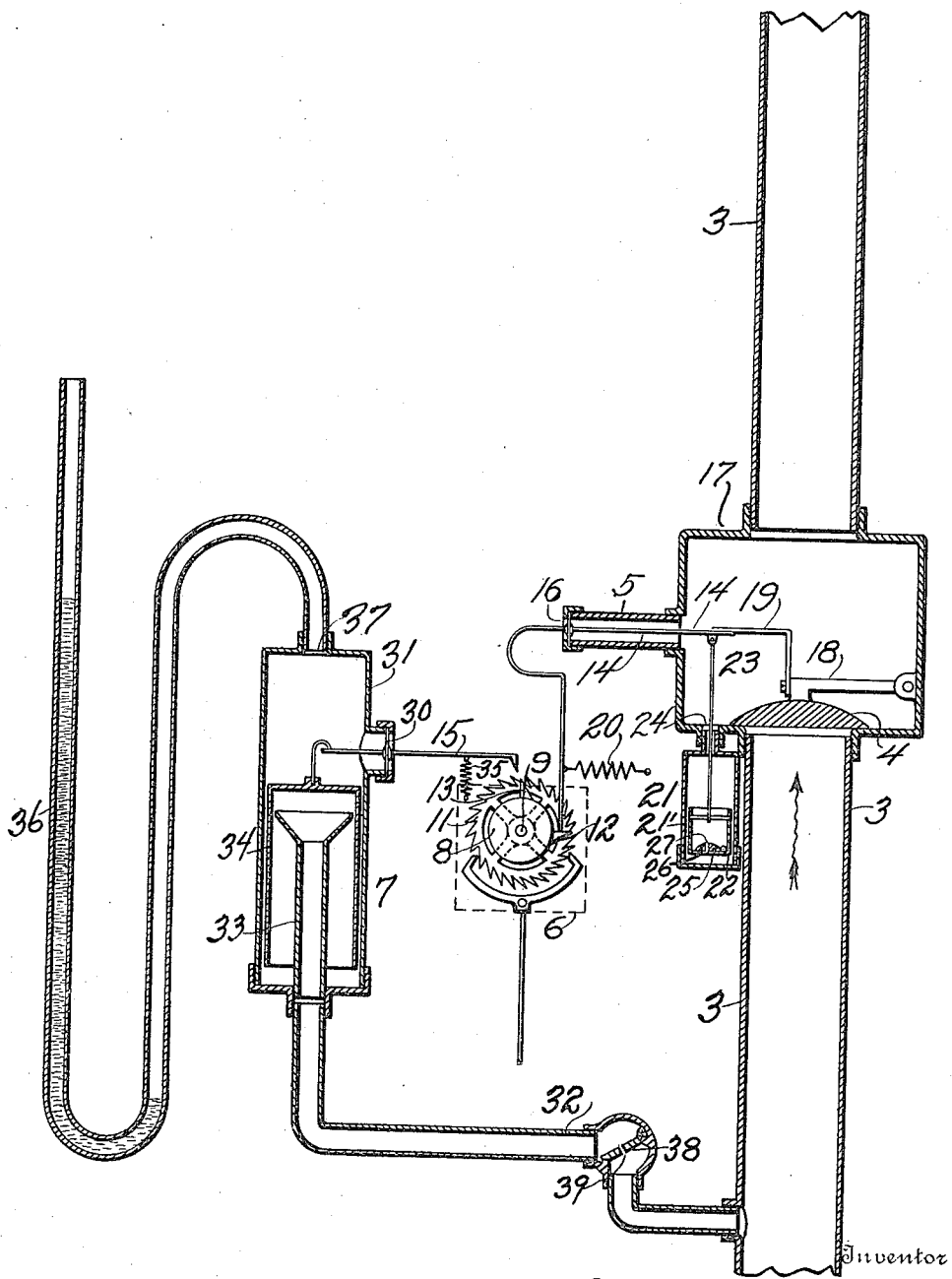

UNITED STATES PATENT OFFICE.

JAMES D. NELSON, OF CINCINNATI, OHIO, ASSIGNOR TO THE OHIO MESSENGER AND TELEGRAPH COMPANY, A CORPORATION OF OHIO.

FLOW-INDICATING MEANS FOR DISTRIBUTION SYSTEMS.

1,170,489.          Specification of Letters Patent.     Patented Feb. 1, 1916.

Application filed January 9, 1913. Serial No. 740,950.

*To all whom it may concern:*

Be it known that I, JAMES D. NELSON, a citizen of the United States of America, and resident of Cincinnati, county of Hamilton, and State of Ohio, have invented certain new and useful Improvements in Flow-Indicating Means for Distribution Systems, of which the following is a specification.

This invention relates to distribution systems and particularly to means for indicating flows in distribution systems of automatic fire extinguisher sprinklers. Various means have been employed, in connection with such distribution systems, for indicating variations in pressure within the system or variations of flow through the system, and my present invention is to produce improved means, which will more accurately and effectively indicate a flow through a distribution system, than other mechanisms which have heretofore been employed for that purpose.

A further object is to produce a sensitive mechanism, which is accurate in its operation of indicating a flow through the system but which will not respond to, or be rendered operative by, pressure variations in the system resulting from water-hammer, or similar causes.

These and other objects I attain by means of a mechanism embodying the features herein described and illustrated in the drawings accompanying and forming a part of this application.

In the drawing I have diagrammatically illustrated a fragmental sectional view of a distribution system in connection with a diagrammatic arrangement of apparatus which embodies my invention.

The apparatus illustrated includes a distribution pipe 3, in which a flow controlled, or flap valve, 4 is located. The valve 4 forms a part of a mechanism which controls the operation of an indicator device or clock mechanism 6, diagrammatically shown in the drawings. The apparatus also includes pressure responsive means 7, which communicates with the pipe 3 and is adapted to coöperate with the mechanism 5 in controlling the operation of the indicating device or clock mechanism and which prevents the clock mechanism from operating when the mechanism 5 has operated in response to a momentary variation in the pressure within the system occasioned by water-hammer or similar cause.

The clock mechanism 6 may, of course, be replaced by any form of alarm or indicating apparatus, as will be apparent to those skilled in the art, and is illustrated merely for convenience. For the purpose of description, and in order to give a full and complete description of my invention, it may be said that the clock mechanism may be similar to the clock mechanism disclosed in my pending application serially numbered 607,538, and, as illustrated, is provided with a control wheel 8, which is mounted on the arbor 9 of the escapement wheel 11. The control wheel 8 is provided with two stops 12 and 13, which respectively coöperate with fingers 14 and 15, in rendering the clock mechanism inoperative, or, in other words, in preventing the escapement wheel 11 from turning. The finger 14 is a part of the flow controlled mechanism and, as shown, extends through a diaphragm 16, which covers a port formed in a valve casing 17 of the distribution system, and is employed for the purpose of permitting the finger to freely move to different positions. The valve 4, as shown, is pivotally secured to one wall of the casing 17 by means of an arm 18, and is capable of being lifted by the water pressure to an open position, in which it permits a free flow of water through the casing in the direction indicated by the arrow in the drawing. A bracket 19 is shown so mounted on the valve 4 that it engages the inner end of the finger 14, when the valve is in the closed position, and thereby moves it to such a position that its outer end stands in the path of travel of the lug 15 on the wheel 8. This prevents the wheel 8 from turning and thereby locks the clock mechanism. The finger 14 is held in this position in opposition to the tension of a spring 20, which operates to move the outer end of the finger out of the path of travel of the stop 12, when the valve 4 is open and the bracket 19 is out of engagement with its inner end. The motion of the finger in response to the pull of the spring is retarded by a retarding device 21, which, as illustrated, consists of a cylinder 21′, in which a cup shaped plunger 22 is located. The upper end of the cylinder communicates with the interior of the casing 17 through a port 24, formed in the casing, and the plunger 22 is connected to the finger 14 by means of a rod 23, which projects through the port 24. The bottom of the cup shaped plunger is provided with a port 25, which is controlled by a flap valve 26, in which a small orifice 27 is provided. The flap valve is so arranged that it readily opens in response to a downward motion of the plunger 22, imparted to it by the closing of the valve 4, but is closed and held in the closed position by an upward movement of the plunger, occasioned by the pull of the spring 20 on the finger 14. With this arrangement the plunger 22, and consequently the finger 14, will move quickly in response to the closing of the valve 4, since the valve 26 will permit a free flow of water through the plunger from the lower to the upper end of the cylinder 21'. The plunger 22 and consequently the finger 14 will, however, move slowly in response to the pull of the spring 20, since the valve 26 will close when the plunger starts to move up, and the orifice 27 will discharge water from the upper to the lower end of the cylinder 21 at a relatively slow rate and consequently the upward motion of the plunger and the motion of the finger 14, will be impeded by the water confined in the upper end of the cylinder. When the valve 4 opens in response to a variation in pressure, occasioned by opening one of the delivery nozzles with which it communicates, the bracket 19 releases the finger 14 and consequently permits the spring 20 to move the outer end of the finger to such a position that the stop 12 is released by it. During this motion of the finger the plunger 22 is moved upwardly and the water displaced by it during this movement is delivered to the lower end of the cylinder through the orifice 27. When the valve 4 closes, the bracket 19 contacts with the finger 14 and moves its outer end to the position in the path of travel of the stop 12, and this motion of the finger is rapid, since the valve 4 is capable of exerting a relatively great force on it, and since the flap valve 26 permits a free delivery through the plunger, of the water in the lower end of the cylinder 21 and below the plunger.

The retarding device is employed for the purpose of preventing the indicating device or clock mechanism from being rendered operative by momentary increases of pressure within the pipe 3, which, under certain conditions, might cause the valve 4 to be momentarily opened.

I have also provided means which operate in response to momentary variations in pressure within the system, to lock the wheel 8 against rotation or to positively prevent the clock mechanism from operating. The finger 15 forms a part of the pressure responsive means and, as illustrated, is secured to, and extends through, a diaphragm 30, which covers a port formed in a pressure cylinder 31. The lower end of the cylinder 31 communicates through piping 32, with the pipe 3, and a riser 33 is so located within the cylinder that it directly communicates with the piping 32 and projects upwardly into an inverted cup-shaped plunger 34, which is mounted in the cylinder 31. The plunger 34 is operatively connected to the inner end of the finger 15, so that it normally holds the finger out of the path of travel of the stop 13, in opposition to the pull of a spring 35. The upper end of the cylinder 31 communicates with a U-tube 36, through a port 37, and the tube is adapted to be filled with mercury or other heavy liquid, for the purpose of counterbalancing the pressure of the water, within the pipe 3, on the plunger 34. When the plunger 34 is subjected to an increase of water pressure, occasioned, for example, by water-hammer within the pipe 3, it rises and thereby permits the spring 35 to move the finger 15 into the path of travel of the stop 13. The increased pressure and the upward motion of the plunger occasions a flow of water through the piping 32 into the cylinder and it also causes the mercury to rise in the tube 36 and to increase the pressure within the cylinder and above the plunger. After the momentary pressure within the pipe 3 has abated, the increased pressure in the cylinder 31 above the plunger 34, tends to move the plunger downwardly and to thereby move the outer end of the finger 15 out of the path of travel of the stop 13. This downward motion of the plunger, however, is retarded by means of a valve 38, which, as illustrated, is a flap valve and is so located within the piping 32, that it will open and permit a free and unimpeded flow of water from the pipe 3 into the cylinder 34, but will close when water tends to flow from the cylinder back into the pipe 3. In the drawings the check valve 38 is provided with an orifice 39 through which, from the cylinder 31, water may be delivered into the pipe 3 when the valve is closed. With this arrangement the downward motion of the plunger is impeded, since the plunger can move no faster than the water can be delivered through the orifice 39, and this retards the withdrawal of the finger 15 from the path of travel of the stop 13. The valve 38 is provided for the purpose of insuring the return of the finger 14 into the path of travel of the stop 12 before the finger 15 is withdrawn from the path of travel of the stop 13. When the pipe 3 is subjected to water-hammer the valve 4 is momentarily opened and consequently the finger 14 tends to release the clock mechanism in response to the pull of the spring 20. The motion of the finger 14 is, however, retarded by the retarding plunger 21. The momentary pressure, which operates to lift the valve 4 also operates through the piping 32 and lifts the plunger 34 and thereby moves the finger 15 into the path of travel of the stop 13. This motion of the plunger 34 is relatively rapid since the valve 38 permits a free flow of water through the pipe 32 into the cylinder and since the spring 35 aids in lifting the plunger; the finger 14 therefore moves into the path of travel of the stop 13 before the wheel 8 is released by the finger 14. As the pressure in the pipe 3 returns to normal the valve 4 moves to its closed position and thereby quickly shifts the finger 14 to its normal position in the path of travel of the stop 12. The abating pressure also permits the plunger 34 to move to its normal position and to withdraw the finger 15 from the path of travel of the stop 13. This motion of the plunger is, however, as has been described, retarded by the valve 38, for the purpose of insuring the locking of the wheel 8 by the finger 14 before it is released by the finger 15. When a flow takes place through the pipe 3, the valve 4 is opened and the spring 20 operates to move the finger 14 out of the path of travel of the stop 12 and to thereby disengage the alarm device. Under such conditions the finger 15 is not moved from its normal position, since the flow of water through the pipe 3 occasions a drop in pressure and the cylinder 34 is not raised.

In accordance with the United States patent statutes, I have illustrated and described the preferred embodiment of my invention, but I desire it to be understood that various changes, modifications and substitutions may be made in the apparatus illustrated, without departing from the spirit and scope of my invention as set forth by the appended claims.

What I claim is:

1. In combination with a distribution system, an alarm device, flow responsive means for controlling the operation of said device, a retarding device for retarding the operation of said means, pressure responsive means coöperating with said flow responsive means in controlling said retarding device and a retarding device for retarding the operation of said pressure responsive means.

2. In combination with a water distribution system, an indicating mechanism, a device for controlling the operation of said mechanism and operative in response to flow through said system, means for retarding the operation of said device, pressure responsive means for locking said mechanism during momentary increases in pressure within said system and means for retarding the operation of said pressure responsive means in releasing said device in response to decreasing pressure within said system.

3. In combination with a distribution system, an alarm device, flow controlled means for releasing said alarm device during periods of flow through the system, a device for retarding the releasing movement of said means, a pressure responsive means for locking said alarm device during periods of excess pressure within said system, and for releasing said alarm device during periods of normal pressure, and a retarding device for controlling the operation of said last mentioned means.

4. In combination with a distribution system, an alarm device, flow controlled means for releasing said alarm device during periods of flow through said system, a device for retarding the releasing movement of said means, pressure responsive means for locking said alarm device during periods of momentary pressure within said system and for releasing the alarm device during periods of normal pressure within said system and a retarding device for retarding the releasing motion of said pressure responsive means.

5. In combination with a distribution system, an alarm device, a release finger for controlling the operation of said device, a flow controlled valve for controlling the operation of said finger, a retarding device for retarding the releasing operation of said finger, and pressure responsive means coöperating with said finger in controlling the operation of said alarm device.

6. In combination with a distribution system, an alarm device, a release finger for controlling the operation of said device, a flow controlled valve for actuating said finger to lock said device, means for moving said finger to release said device, during periods of flow through the system, and a retarding device for retarding the releasing motion of said finger.

7. In combination with a distribution system, an alarm device, a release finger for controlling the operation of said device, a flow controlled valve for controlling the operation of said finger, a retarding device for retarding the releasing operation of the finger, a locking finger for said alarm device, pressure controlled means for controlling the operation of said locking finger, and a retarding device for retarding the releasing motion of said retarding finger.

8. In combination in a distribution system, an alarm device, a release finger for locking said alarm device, a flow controlled valve within said system for holding said finger in a device-locking position, yielding means for moving said finger to release said device during periods of flow through said system and a retarding plunger for retarding the releasing operation of said finger.

9. In combination in a distribution system, an indicating device, a release finger for controlling the operation of said device, a flow controlled valve for holding said finger in a device-locking position when closed, means for moving said finger to release the device when the valve is open, a retarding device for retarding the releasing motion of the finger and a pressure responsive device for locking said alarm device when said valve is opened in response to increases in pressure within the system.

10. In combination with a distribution system, a flow responsive valve, a signal transmitter, and a lever having retarded movement, operatively associated with the valve and the signal transmitter, said lever being responsive to an abnormal condition of the valve for a period of time sufficient to allow it to trip the transmitter, said lever being adapted to be instantly restored to its normal position by the valve after cessation of such abnormal condition.

11. In combination in a distribution system, a valve, a signal transmitter, a lever adapted to control the transmitter, a timing device adapted to retard the lever during its transmitter releasing motion, said timing device rendering the lever responsive to an abnormal condition of the valve, for a predetermined time to mechanically trip the transmitter, said timing device being adapted to permit said lever to be restored to its normal position by the valve.

12. In a flow indicating means for distribution systems, a check valve, a transmitter, a lever controlled by said valve and adapted to lock and unlock the transmitter, means for retarding the unlocking movement of the lever, and means whereby the lever may be instantly restored to its normal position by the valve, after abnormal operation of the valve, not caused by a flow through the distribution system.

13. In combination with a distribution system, an alarm device, a lever adapted to release said alarm device, a retard mechanism coöperating with said lever, a flow controlled valve adapted to release said alarm device by means of said lever, when the valve is held open for a predetermined time, said valve being adapted to restore the lever to its normal position when said valve is restored to its normal position.

14. In combination with a distribution system, an alarm device, a coöperating lever and retard mechanism, adapted to control said alarm device, a flow controlled valve adapted to release said alarm device by means of said lever, when the valve has been held open for a predetermined time, and to restore said lever and said retard mechanism to their normal condition when said valve has been in an open position for less than the predetermined time.

15. In combination with a distribution system, an alarm device, a lever coöperating with the alarm device, a retard mechanism adapted to control the operation of said lever, a flow controlled valve adapted to actuate the lever and retard mechanism, means for causing said lever and retard mechanism to unlock said alarm device during periods of flow through the system for a predetermined time, and a second means adapted to cause said valve to restore said lever to its normal position upon cessation of the flow.

16. In combination with a distribution system, a flow responsive valve, an alarm device, means having retard movement adapted to trip said alarm device, and mechanical means having operative connection with the valve for releasing said alarm device during periods of flow within the system for a predetermined time, said mechanical means being adapted to restore said retard means to normal conditions simultaneously with the valve after periods of flow of less than the predetermined time.

17. In combination with a distribution system, an alarm mechanism, a retard device, a lever controlled by said retard device and adapted to trip said alarm mechanism, a flow controlled valve adapted to release said lever, whereby said lever will trip the alarm mechanism when the valve is open for a predetermined time, said valve being adapted to restore said lever and retard device to normal conditions, upon closing.

18. In combination with a distribution system, a flow responsive valve, an alarm device, mechanical means having retard movement, adapted to trip said alarm device, and means connecting the valve with said mechanical means, whereby the alarm device will be released by the valve during periods of flow within the system for a predetermined time, and whereby said mechanical means will be restored to normal conditions simultaneously with the valve after periods of flow of less than the predetermined time.

In testimony whereof, I have hereunto subscribed my name this 7th day of January, 1913.

JAMES D. NELSON.

Witnesses:
E. W. McCallister,
W. Thornton Bogert.